(12) United States Patent
Bendre et al.

(10) Patent No.: US 7,307,361 B1
(45) Date of Patent: Dec. 11, 2007

(54) MEDIUM VOLTAGE POWER CONVERTER FORMED USING LOW VOLTAGE DRIVES

(75) Inventors: Ashish R. Bendre, Shorewood, WI (US); Slobodan Krstic, Brookfield, WI (US); James C. Vandermeer, Brookfield, WI (US)

(73) Assignee: DRS Power & Control Technologies, Inc., Milwaukee, WI (US)

( * ) Notice: Subject to any disclaimer, the term of this patent is extended or adjusted under 35 U.S.C. 154(b) by 0 days.

(21) Appl. No.: 11/559,163

(22) Filed: Nov. 13, 2006

(51) Int. Cl.
  *H02J 3/00* (2006.01)
  *H01F 30/12* (2006.01)
  *H01F 27/28* (2006.01)
(52) U.S. Cl. .............. 307/83; 363/65; 336/5; 336/180; 336/170
(58) Field of Classification Search .......... 307/83; 363/74, 67, 65; 366/5, 170, 180
See application file for complete search history.

(56) References Cited

U.S. PATENT DOCUMENTS

| | | | |
|---|---|---|---|
| 4,779,181 A * | 10/1988 | Traver et al. | ............ 363/154 |
| 5,602,725 A | 2/1997 | Venkataramanan | |
| 5,625,545 A | 4/1997 | Hammond | |
| 5,909,367 A | 6/1999 | Change | |
| 5,986,909 A | 11/1999 | Hammond et al. | |
| 6,014,323 A | 1/2000 | Aiello et al. | |
| 6,166,513 A | 12/2000 | Hammond | |
| 6,301,130 B1 | 10/2001 | Aiello et al. | |
| 6,340,851 B1 | 1/2002 | Rinaldi et al. | |
| 6,411,530 B2 | 6/2002 | Hammond et al. | |
| 6,608,044 B1 | 8/2003 | Aderka et al. | |
| 6,954,366 B2 * | 10/2005 | Lai et al. | ............ 363/71 |

OTHER PUBLICATIONS

E. Cengelci, et al., "A New Medium-Voltage PWM Inverter Topology for Adjustable-Speed Drives", IEEE Transactions on Industry Applications, vol. 35, No. 3, May/Jun. 1999, pp. 628-637.

\* cited by examiner

*Primary Examiner*—Shawn Riley
(74) *Attorney, Agent, or Firm*—Sonnenschein Nath & Rosenthal LLP

(57) ABSTRACT

A medium voltage power converter is provided that has an input transformer adapted to connect to a multi-phase power source, multiple low voltage drives each coupled to a respective set of secondary windings of the input transformer and operatively configured to provide a corresponding set of three-phase power outputs, and an output transformer. The output transformer has multiple input primary winding circuits each operatively coupled to the three-phase power outputs of a respective one of the drives, a plurality of output secondary winding circuits each disposed in relation to a respective input primary winding circuit, and a secondary winding connection arrangement in which each output secondary winding circuit has three secondary windings each of which is connected in series or in parallel with each other secondary winding of each other output secondary winding circuit to form a respective one of three phase-shifted outputs of the secondary winding connection arrangement.

11 Claims, 6 Drawing Sheets

MEDIUM VOLTAGE POWER CONVERTER FORMED USING LOW VOLTAGE DRIVES

FIELD OF THE INVENTION

The present invention relates to variable frequency medium voltage drives, more particularly, to a medium voltage power converter employing a plurality of low voltage drives coupled between a passive input transformer and a passive output transformer to synthesize medium voltage variable frequency drive outputs.

BACKGROUND OF THE INVENTION

A conventional variable frequency medium voltage drive typically is employed to drive a medium voltage motor for the control of 5 MW to 75 MW loads or processes. The conventional medium voltage drive usually operates at medium voltages of 4.16 kV to 13.2 kV as operation at voltages substantially lower than 4.16 kV leads to excessive currents and power losses. While a conventional medium voltage drive can be manufactured using a standard high voltage power semiconductor, the selection and availability of standard high voltage power semiconductors are limited. In addition, conventional high voltage power semiconductors typically are severely lacking in switching speed, thus limiting the switching frequency. In addition, conventional medium voltage drives typically require specialized multi-level circuitry that tends to increase the dollar cost per kva of the drive.

Conventional low voltage drives of 400V-690V typically cost significantly less per kva than medium voltage drives due to higher production volume, technology maturity and market pressures. However, these conventional low voltage drives are not by themselves suited for controlling 5 MW to 75 MW loads or processes.

One conventional medium voltage inverter, described in E. Cengelci et al., *A New Medium-Voltage PWM Inverter Topology for Adjustable-Speed Drives*, Vol. 35 No. 3 IEEE Transactions On Industry Applications 628-637 (1999), uses three standard three-phase rectifier/inverter modules coupled between a three-phase input transformer and a three-phase output transformer to generate three-phase medium voltage outputs. However, the connections between the rectifier/inverter modules and the output transformer utilize H-bridge converters and single phase loading that require high voltage isolation and appropriate cooling methods.

Therefore, there is a need for a medium voltage drive or power converter that overcomes the problems noted above and others previously experienced for synthesizing medium voltage variable frequency drive outputs.

SUMMARY OF THE INVENTION

Systems and articles of manufacture consistent with the present invention provide a medium voltage power converter. The medium voltage power converter comprises an input transformer, a plurality of low voltage drives, and an output transformer. The input transformer has a primary winding circuit adapted to connect to a multi-phase AC power source and a plurality of secondary winding circuits each of which has three or more phase-shifted outputs. Each low voltage drive has a plurality of power inputs and a plurality of power outputs. Each power input is operatively connected to a corresponding one of the phase-shifted outputs of a respective one of the secondary winding circuits. Each power output is operatively connected to a respective one of the power inputs such that each power output is adapted to provide a current substantially in-phase with the respective one power input of the drive. The output transformer has a plurality of input primary winding circuits, a plurality of output secondary winding circuits, and a secondary winding connection arrangement having a plurality of phase-shifted outputs. Each of the input primary winding circuits has a plurality of input primary windings. Each input primary winding is operatively connected to a respective one of the power outputs of a respective one of the low voltage drives. Each output secondary winding circuit has a plurality of output secondary windings. Each output secondary winding is disposed in relation to a respective one of the input primary windings. Each phase-shifted output of the secondary winding connection arrangement is operatively connected to one of the output secondary windings of each output secondary winding circuit.

Systems and articles of manufacture consistent with the present invention provide another medium voltage power converter comprising an input transformer having a primary winding circuit adapted to connect to a multi-phase AC power source and a plurality of secondary winding circuits each of which has three phase-shifted outputs each adapted to provide up to approximately 700 VAC. The medium voltage power converter further comprises a plurality of low voltage drives. Each low voltage drive has a plurality of power inputs, each of which is operatively connected in phase relationship to a respective one of the three phase-shifted outputs from a respective one of the secondary winding circuits. Each low voltage drive also has a plurality of power outputs operatively connected to a respective one of the power inputs such that each power output is adapted to provide a current substantially in-phase with the respective one power input. The medium voltage power converter further comprises an output transformer having a plurality of input primary winding circuits, a plurality of output secondary winding circuits and a secondary winding connection arrangement having three phase-shifted outputs. Each of the input primary winding circuits has three input primary windings each of which is operatively connected in phase relationship to a respective one of the power outputs of a respective one of the low voltage drives. Each output secondary winding circuit has three output secondary windings each of which is operatively connected in phase relationship with a respective one of the input primary windings of a respective one of the input primary winding circuits. A first of the output secondary windings of each output secondary winding circuit are connected in series to generate a first of the phase-shifted outputs of the secondary winding connection arrangement. A second of the output secondary windings of each output secondary winding circuit are connected in series to generate a second of the phase-shifted outputs of the secondary winding connection arrangement. A third of the output secondary windings of each output secondary winding circuit are connected in series to generate a third of the phase-shifted outputs of the secondary winding connection arrangement.

Systems and articles of manufacture consistent with the present invention provide another medium voltage power converter comprising an input transformer, a plurality of low voltage drives and an output transformer. The input transformer has a primary winding circuit adapted to connect to a multi-phase AC power source and a plurality of secondary winding circuits. Each secondary winding circuit has three phase-shifted outputs each adapted to provide up to approximately 700 VAC. Each low voltage drive has a plurality of power inputs each of which is operatively connected in phase relationship to a respective one of the three phase-shifted outputs from a respective one of the secondary winding circuits, and a plurality of power outputs operatively connected to a respective one of the power inputs such that each power output is adapted to provide a current substantially in-phase with the respective one power input. The output transformer has a plurality of input primary winding circuits, a plurality of output secondary winding circuits and a secondary winding connection arrangement including three phase-shifted outputs. Each of the input primary winding circuits has three input primary windings each of which is operatively connected in phase relationship to a respective one of the power outputs of a respective one of the low voltage drives. Each output secondary winding circuit has three output secondary windings each of which is operatively connected in phase relationship with a respective one of the input primary windings of a respective one of the input primary winding circuits. A first of the output secondary windings of each output secondary winding circuit are connected in parallel to generate a first of the phase-shifted outputs of the secondary winding connection arrangement. A second of the output secondary windings of each output secondary winding circuit are connected in parallel to generate a second of the phase-shifted outputs of the secondary winding connection arrangement. A third of the output secondary windings of each output secondary winding circuit are connected in parallel to generate a third of the phase-shifted outputs of the secondary winding connection arrangement.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings.

DETAILED DESCRIPTION OF THE INVENTION

Reference will now be made in detail to an implementation in accordance with methods, systems, and products consistent with the present invention as illustrated in the accompanying drawings.

Figure 1:
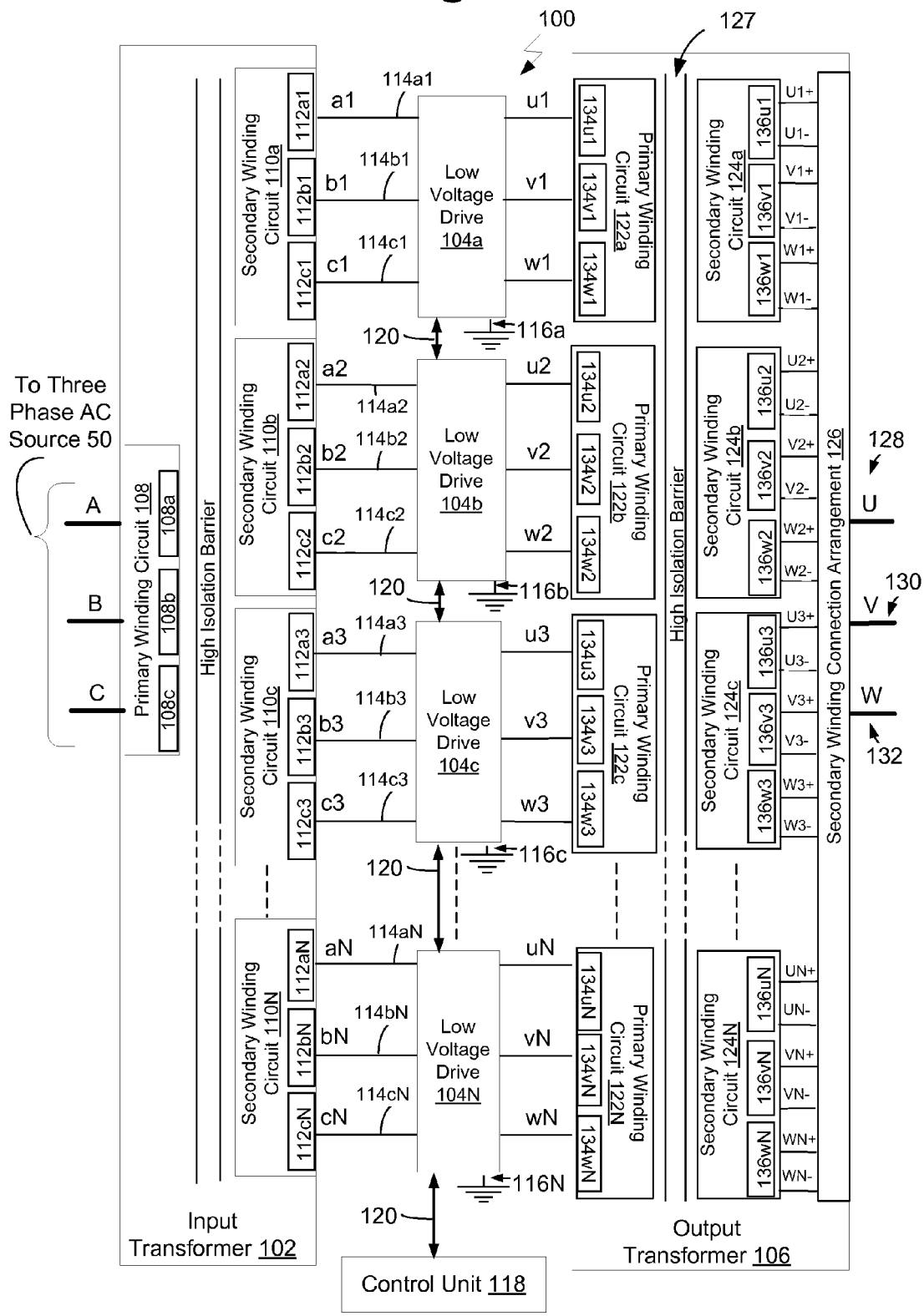
FIG. 1 is a block diagram of an exemplary medium voltage power converter consistent with the present invention.

FIG. 1 is a block diagram depicting an exemplary medium voltage power converter 100 consistent with the present invention. The medium voltage power converter 100 includes an input transformer 102, a plurality of low voltage drives 104a-104N, and an output transformer 106. The input transformer 102 includes a primary winding circuit 108 having three phase inputs A, B, and C adapted to be connected to a medium voltage three phase AC source 50 and a plurality of secondary winding circuits 110a-110N each of which is operatively configured to step down the three phase inputs A, B, and C to provide respective low voltage three phase outputs a1, b1, c1; a2, b2, c2; a3, b3, c3; and aN, bN, cN to a respective low voltage drive 104a-104n as shown in FIG. 1.

As described herein, a "low voltage" is a voltage between about 0 VAC and about 700 VAC. A "medium voltage" is a voltage greater than 700 VAC.

The primary winding circuit 108 has primary windings 108a, 108b, and 108c connected in a delta, extended delta, or star (e.g., wye) configuration. Each secondary winding circuits 110a-110N also has respective secondary windings 112a1, 112b1, 112c1; 112a2, 112b2, 112c2; 112a3, 112b3, 112c3; or 112aN, 112bN, 112cN connected in a delta, extended delta, or star (e.g., wye) configuration in phase relationship with the primary windings 108a, 108b, and 108c. When connected in a star configuration, each secondary winding circuit 110a-110N may have a floating neutral. In the implementation shown in FIG. 1, the primary winding 108a, 108b, or 108c is operatively configured to receive one of the three phase inputs A, B, or C. In response to receiving the phase A input, the primary winding 108a energizes each one of the secondary windings 112a1, 112a2, 112a3 and 112aN of each secondary winding circuit 110a-110N that is operatively disposed in phase relationship with (or having the same phase as) the primary winding 108a in order to generate the corresponding low voltage phase outputs a1, a2, a3, and aN. Similarly, in response to receiving the phase B input, the primary winding 108b energizes each one of the secondary windings 112b1, 112b2, 112b3 and 112bN of each secondary winding circuit 110a-110N that is operatively disposed in phase relationship with (or having the same phase as) the primary winding 108b in order to generate the corresponding low voltage phase outputs b1, b2, b3, and bN. In response to receiving the phase C input, the primary winding 108c energizes each one of the secondary windings 112c1, 112c2, 112c3 and 112cN of each secondary winding circuit 110a-110N that is operatively disposed in phase relationship with (or having the same phase as) the primary winding 108c in order to generate the corresponding low voltage phase outputs c1, c2, c3, and cN.

Each low voltage drive 104a-104N may be a Vacon NXL, NXS, NXP or NXC model AC drive, a Yaskawa Electrical America model G7 drive, a Siemens Simovert series drive or any other known AC fed three phase low voltage drive operatively configured to control variable frequency inputs to provide corresponding substantially constant current three phase outputs. By using known low voltage drives 104a-104N in accordance with the present invention, the medium voltage power converter 100 may be implemented at a lower cost and with increased modularity over conventional medium voltage variable frequency drives. As shown in FIG. 1, each low voltage drive 104a-104N has a plurality of power inputs 114a1, 114b1, 114c1; 114a2, 114b2, 114c2; 114a3, 114b3, 114c3; or 114aN, 114bN, 114cN, each of which is operatively connected to a corresponding low voltage three phase output a1, b1, c1; a2, b2, c2; a3, b3, c3; or aN, bN, cN. Each low voltage drive 104a-104N also has a plurality of power outputs u1, v1, w1; u2, v2, w2; u3, v3, w3; and uN, vN, wN, each of which is operatively connected to a respective one of the power inputs such that each power output is adapted to provide a current substantially in-phase with the respective power input. Each power output u1, v1, w1, u2, v2, w2, u3, v3, w3, uN, vN and wN is separately referenced to a ground input 116a, 116b, 116c, or 116N of the respective low voltage drive 104a-104N to isolate each low voltage drive 104a-104N from each other low voltage drive and each power output u1, v1, w1, u2, v2, w2, u3, v3, w3, aN, bN and cN from each other power output of the same low voltage drive.

The medium voltage power converter 100 also may include a control unit 118 operatively connected to each low voltage drive 104a-104N over a network 120 to allow a user to remotely configure and control each low voltage drive 104a-104N in accordance with a load or motor (not shown in figures) operatively coupled to three phase medium voltage outputs U, V, and W of the output transformer in accordance with the present invention. The control unit 118 is operatively configured to synchronize the output AC voltage and frequency of the low voltage drives 104a-104N.

The output transformer 106 has a plurality of input primary winding circuits 122a-122N, a plurality of output secondary winding circuits 124a-124N, and a secondary winding connection arrangement 126 having a plurality of phase-shifted outputs 128, 130, and 132. In the implementation shown in FIG. 1, each output secondary winding circuit 124a-12N is disposed across a single high isolation barrier 127 in relation to a corresponding input primary winding circuit 122a-122N. However, as discussed in further detail below, each input primary winding circuit (e.g., 122a) and each corresponding secondary winding circuit (e.g., 124a) may be formed in a respective transformer having a separate high isolation barrier.

Each of the input primary winding circuits 122a-122N has a plurality of input primary windings 134u1, 134v1, 134w1; 134u2, 134v2, 134w2; 134u3, 134v3, 134w3; and 134uN, 134vN, 134wN, which may be connected in a delta or star (e.g., wye) configuration. Each input primary winding 134u1, 134v1, 134w1, 134u2, 134v2, 134w2, 134u3, 134v3, 134w3, 134uN, 134vN and 134wN is operatively connected to a respective one of the power outputs u1, v1, w1, u2, v2, w2, u3, v3, w3, uN, vN, or wN of a respective one of the low voltage drives 104a-104N.

Figure 2A:
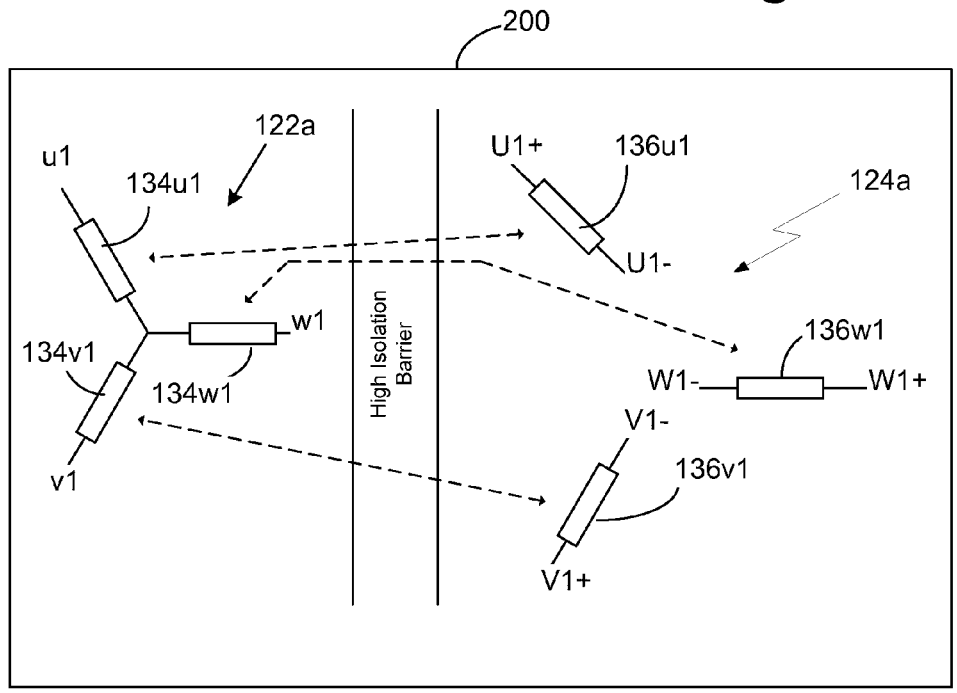
FIG. 2A is a block diagram depicting the structure of one of a plurality of input primary winding circuits of an output transformer in the medium voltage power converter in FIG. 1 and a corresponding one of a plurality of output secondary winding circuits in the output transformer in accordance with the present invention.

Each output secondary winding circuit 124a-124N has a plurality of output secondary windings 136u1, 136v1, 136w1; 136u2, 136v2, 136w2; 136u3, 136v3, 136w3; or 136uN, 136vN, 136wN each of which corresponds to and is energized by a respective one of the input primary windings 134u1, 134v1, 134w1, 134u2, 134v2, 134w2, 134u3, 134v3, 134w3, 134uN, 134vN and 134wN. FIG. 2A depicts one implementation of the structural phase relationship 200 between the secondary windings (e.g., 136u1, 136v1, and 136w1) of each output secondary winding circuit (e.g., 124a) and the primary windings (e.g., 134u1, 134v1, and 134w1) of a corresponding input primary winding circuit (e.g., 122a) of the output transformer 106 in accordance with the present invention. As shown in FIGS. 1 and 2A, each output secondary winding 136u1, 136v1, 136w1, 136u2, 136v2, 136w2, 136u3, 136v3, 136w3, 136uN, 136vN, and 136wN has two polarized ends (e.g., U1+, U1−; V1+, V1−; or W1+, W1− for windings 136u1, 136v1, and 136w1, respectively) reflecting the phase (e.g., U, V, or W) and current direction (e.g., negative to positive) associated with the respective output secondary winding 136u1, 136v1, 136w1, 136u2, 136v2, 136w2, 136u3, 136v3, 136w3, 136uN, 136vN, and 136wN.

Figure 2B:
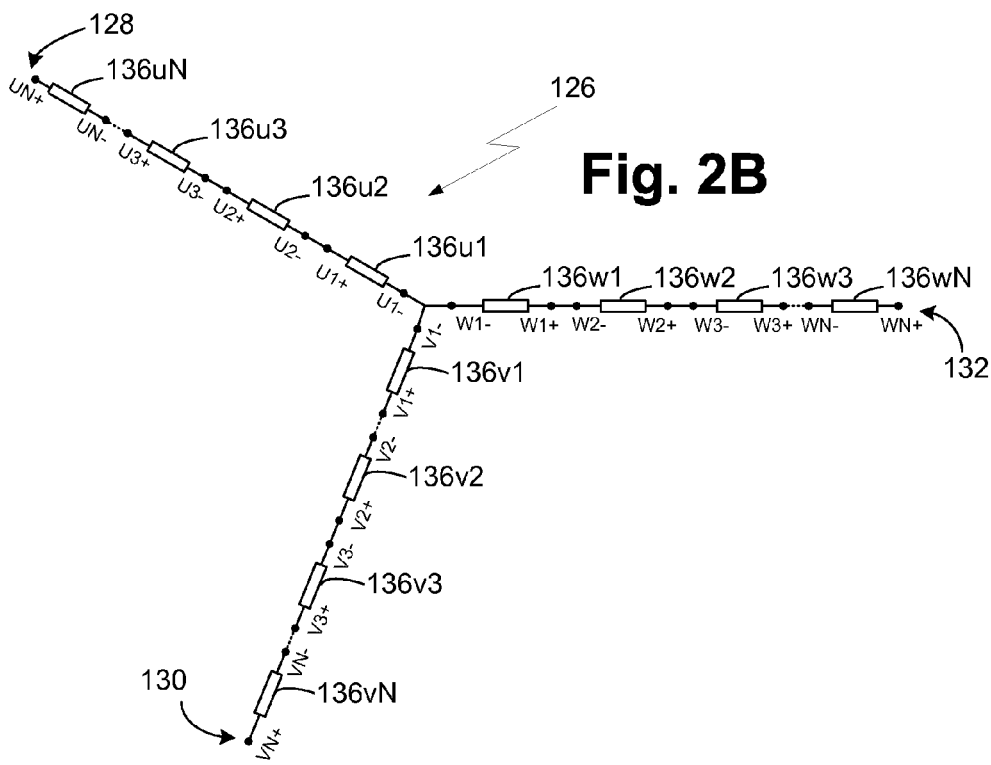
FIG. 2B is a block diagram depicting one embodiment of a secondary winding connection arrangement of the output transformer in FIG. 2A in accordance with the present invention, where each secondary winding of each output secondary winding circuit in the output transformer having the same phase are connected in series to form one of three phase-shifted outputs of the output transformer.

FIG. 2B depicts one embodiment of the secondary winding connection arrangement 126 of the output transformer 106 consistent with the present invention. In the implementation shown in FIG. 2B, each output secondary winding of each output secondary winding circuit in the output transformer associated with or having the same phase (e.g., windings 136u1, 136u2, 136u3, and 136uN associated with phase input A or u in FIGS. 1, 2A, and 2B; windings 136v1, 136v2, 136v3, and 136vN associated with phase input B or v in FIGS. 1, 2A, and 2B; and windings 136w1, 136w2, 136w3, and 136wN associated with phase input C or w in FIGS. 1, 2A, and 2B) are connected in series to form one of three phase-shifted outputs 128, 130, and 132 of the output transformer 106. Each phase-shifted output 128, 130, and 132 of the secondary winding connection arrangement 126 is operatively connected to one of the output secondary windings (e.g., 136u1, 136v1, and 136w1) of each output secondary winding circuit (e.g., 124a-124N). For example, in the implementation shown in FIG. 2B, a first of the output secondary windings of each output secondary winding circuit associated with phase input A or u (e.g., 136u1, 136u2, 136u3 and 136uN) are connected in series to generate a first 128 of the phase-shifted outputs 128, 130, and 132 of the secondary winding connection arrangement 126, a second of the output secondary windings of each output secondary winding circuit associated with phase input B or v (e.g., 136v1, 136v2, 136v3 and 136vN) are connected in series to generate a second 130 of the phase-shifted outputs 128, 130, and 132 of the secondary winding connection arrangement 126, and a third of the output secondary windings of each output secondary winding circuit associated with phase input C or w (e.g., 136*w*1, 136*w*2, 136*w*3 and 136*w*N) are connected in series to generate a third 132 of the phase-shifted outputs 128, 130, and 132 of the secondary winding connection arrangement 126. In this implementation, the three phase-shifted outputs 128, 130 and 132 are joined in a wye connection via the series connection of each output secondary winding (e.g., 136*u*1, 136*v*1, and 136*w*1) of each output secondary winding circuit 124*a*-124N associated with a respective phase input u, v, or w. As discussed in further detail below, in an alternative implementation, the three phase-shifted outputs 128, 130 and 132 are joined in a wye connection via a parallel connection of each output secondary winding (e.g., 136*u*1, 136*v*1, and 136*w*1) of each output secondary winding circuit 124*a*-124N associated with a respective phase input u, v, or w. Either implementation of the secondary winding connection arrangement 126 allows each phase-shifted output 128, 130 and 132 to incrementally generate respective medium voltages (e.g., 700 VAC to 15 kVAC) from each power output of the standard low voltage drives 104*a*-104N having the same phase u, v, or w.

Figure 3:
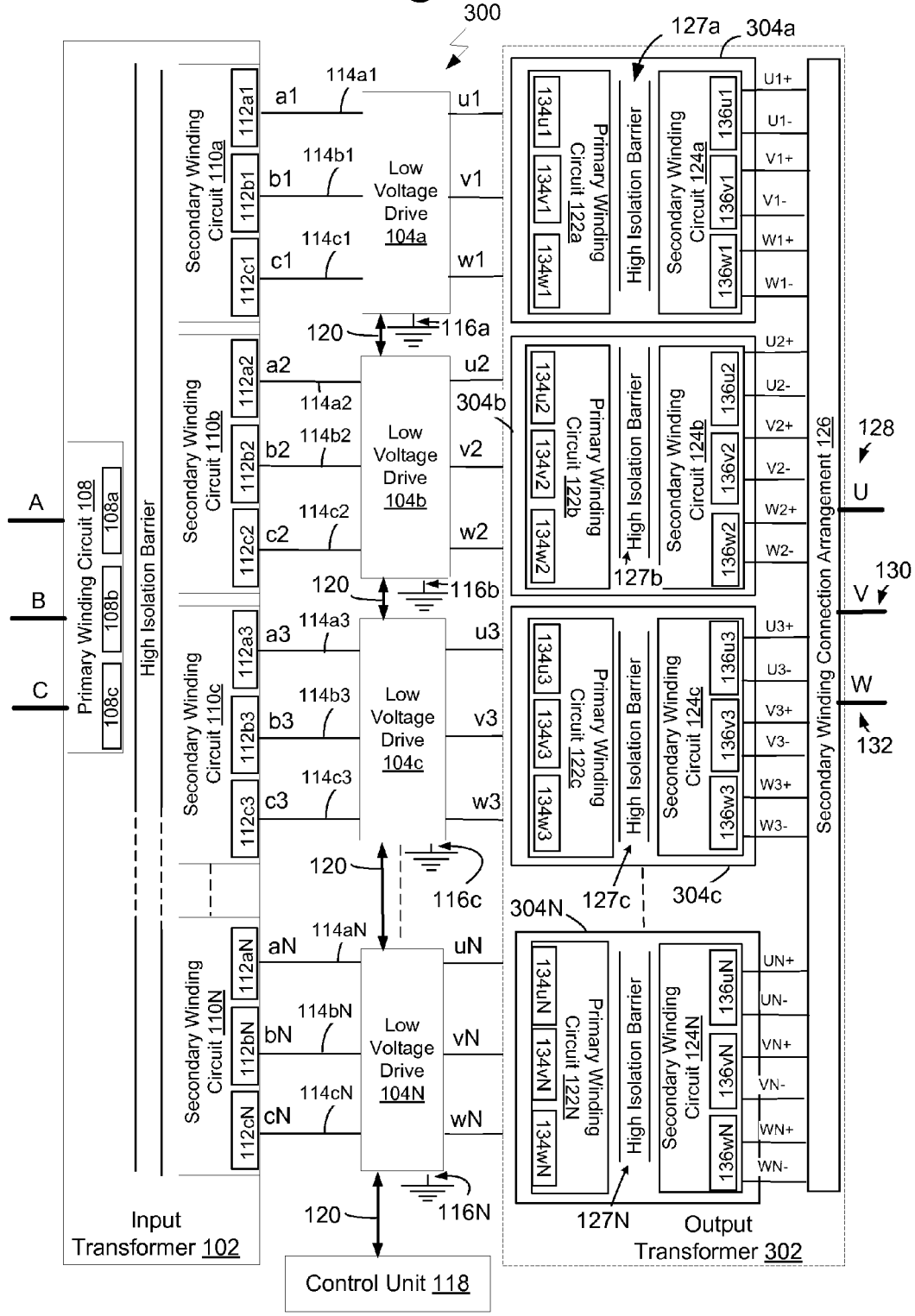
FIG. 3 is a block diagram of another exemplary medium voltage power converter consistent with the present invention in which the output transformer of the medium voltage power converter has a plurality of individual transformers each of which has a respective input primary winding circuit and a respective output secondary winding circuit where each secondary winding of each output secondary winding circuit of each individual transformer having the same phase are connected in series to form one of three phase-shifted outputs of the output transformer.

FIG. 3 depicts another exemplary medium voltage power converter 300 consistent with the present invention. As shown in FIG. 3, the medium voltage power converter 300 includes an input transformer 102, a plurality of low voltage drives 104*a*-104N, and an output transformer 302 having a secondary winding connection arrangement 126 consistent with the medium voltage power converter 100. However, the output transformer 302 includes or is implemented using a plurality of individual transformers 304*a*-304N. Each of the individual transformers 304*a*-304N has a respective input primary winding circuit 122*a*, 122*b*, 122*c* or 122N and a respective output secondary winding circuit 124*a*, 124*b*, 124*c* or 124N disposed across a respective high isolation barrier 127*a*, 127*b*, 127*c* or 127N in relation to the input primary winding circuit 122*a*-122N of the individual transformer 304*a*, 304*b*, 304*c* or 304N.

In this implementation, each of the input primary winding circuits 122*a*-122N of each individual transformer 304*a*-304N has a respective plurality or set of input primary windings 134*u*1, 134*v*1, 134*w*1; 134*u*2, 134*v*2, 134*w*2; 134*u*3, 134*v*3, 134*w*3; or 134*u*N, 134*v*N, 134*w*N. Each input primary winding 134*u*1, 134*v*1, 134*w*1, 134*u*2, 134*v*2, 134*w*2, 134*u*3, 134*v*3, 134*w*3, 134*u*N, 134*v*N and 134*w*N is operatively connected to a respective one of the power outputs u1, v1, w1, u2, v2, w2, u3, v3, w3, uN, vN, or wN of a respective one of the low voltage drives 104*a*-104N.

Each output secondary winding circuit 124*a*-124N of each individual transformer 304*a*-304N has a respective plurality or set of output secondary windings 136*u*1, 136*v*1, 136*w*1; 136*u*2, 136*v*2, 136*w*2; 136*u*3, 136*v*3, 136*w*3; or 136*u*N, 136*v*N, 136*w*N each of which corresponds to and is energized by a respective one of the input primary windings 134*u*1, 134*v*1, 134*w*1, 134*u*2, 134*v*2, 134*w*2, 134*u*3, 134*v*3, 134*w*3, 134*u*N, 134*v*N and 134*w*N of the individual transformer 304*a*, 304*b*, 304*c* or 304N as depicted in FIG. 2A.

In the implementation shown in FIG. 3, the secondary winding connection arrangement 126 operatively connects in series each output secondary winding of each output secondary winding circuit in each of the individual transformers 304*a*-304N that is associated with or has the same phase (e.g., windings 136*u*1, 136*u*2, 136*u*3, and 136*u*N associated with phase input A or u in FIGS. 2B and 3; windings 136*v*1, 136*v*2, 136*v*3, and 136*v*N associated with phase input B or v in FIGS. 2B and 3; and windings 136*w*1, 136*w*2, 136*w*3, and 136*w*N associated with phase input C or w in FIGS. 2B and 3) to form each of three phase-shifted outputs 128, 130, and 132 as shown in FIG. 2B. In this implementation, the three phase-shifted outputs 128, 130 and 132 are joined in a wye connection via the series connection of each output secondary winding (e.g., 136*u*1, 136*v*1, and 136*w*1) of each output secondary winding circuit 124*a*-124N associated with a respective phase input u, v, or w. As discussed in further detail below, in an alternative implementation, the three phase-shifted outputs 128, 130 and 132 are joined in a wye connection via a parallel connection of each output secondary winding (e.g., 136*u*1, 136*v*1, and 136*w*1) of each output secondary winding circuit 124*a*-124N associated with a respective phase input u, v, or w.

Figure 4:
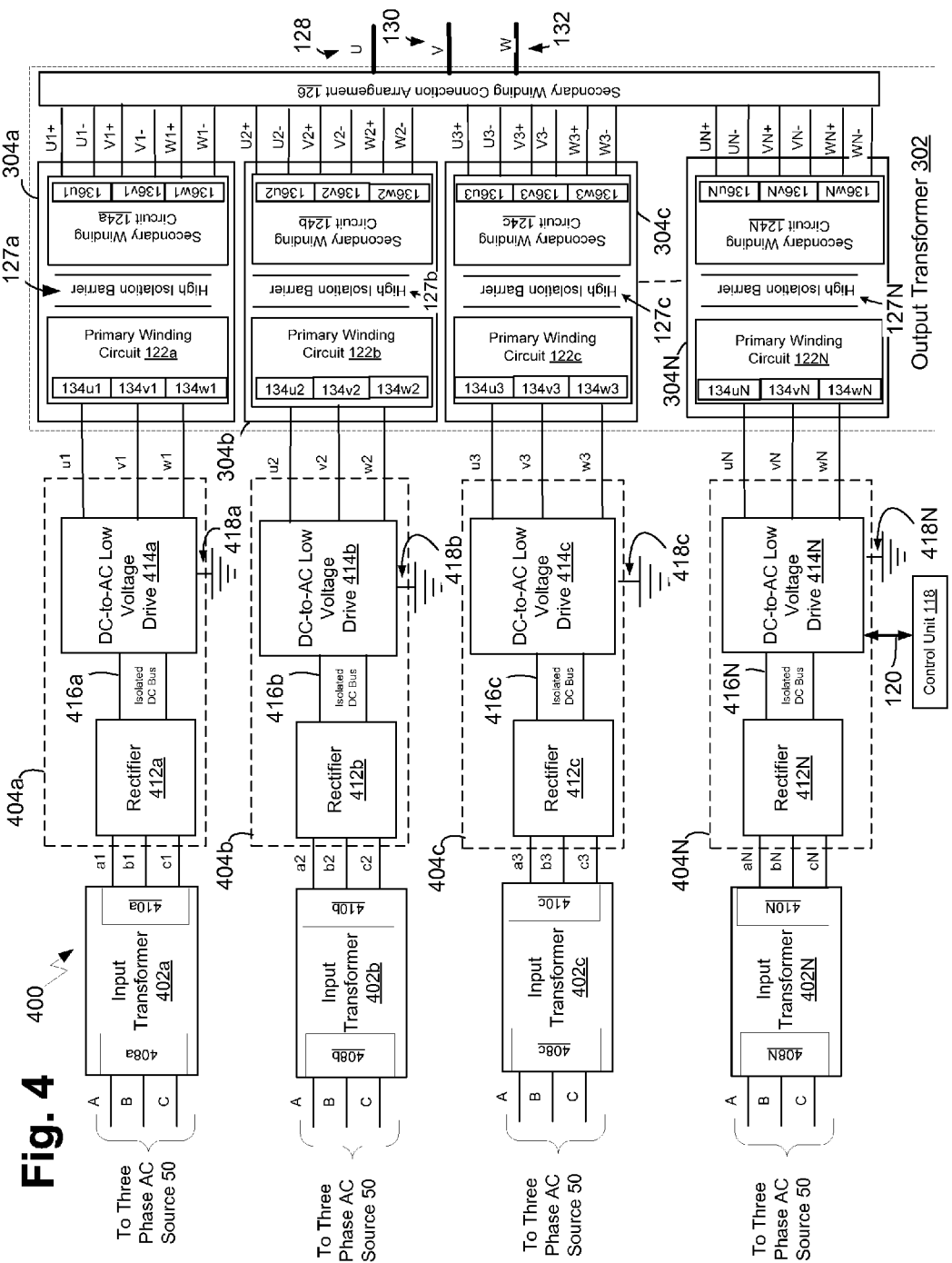
FIG. 4 is a block diagram of another exemplary medium voltage power converter consistent with the present invention, where the medium voltage power converter has multiple input transformers.

FIG. 4 depicts another exemplary medium voltage power converter 400 consistent with the present invention. As shown in FIG. 4, the medium voltage power converter 400 includes a plurality of input transformers 402*a*-402N, a plurality of low voltage drive systems 404*a*-404N, and an output transformer 302 having a secondary winding connection arrangement 126 consistent with the medium voltage power converter 300 in FIG. 3. Each input transformer 402*a*-402N includes a primary winding circuit 408*a*, 408*b*, 408*c* or 408N having three phase inputs A, B, and C adapted to be connected to a medium voltage three phase AC source 50 and a secondary winding circuit 410*a*, 410*b*, 410*c*, or 410N each of which is operatively configured to step down the three phase inputs A, B, and C to provide a respective set of low voltage three phase outputs a1, b1, c1; a2, b2, c2; a3, b3, c3; or aN, bN, cN to a respective low voltage drive system 404*a*, 404*b*, 404*c*, or 404N as shown in FIG. 4.

Each primary winding circuit 408*a*-408N has a set of primary windings (not shown in FIG. 4) connected in a delta, extended delta, or star (e.g., wye) configuration similar to the windings 108*a*, 108*b*, and 108*c* of the input transformer 102. Each secondary winding circuit 410*a*-410N also has a respective set of secondary windings (not shown in FIG. 4) connected in a delta, extended delta, or star (e.g., wye) configuration in phase relationship with the primary windings of the input transformer 402*a*, 402*b*, 402*c* or 402N similar to the secondary windings 112*a*1, 112*b*1, 112*c*1; 112*a*2, 112*b*2, 112*c*2; 112*a*3, 112*b*3, 112*c*3; or 112*a*N, 112*b*N, 112*c*N of the input transformer 102.

In the implementation shown in FIG. 4, each low voltage drive or system 404*a*-404N comprises a rectifier 412*a*, 412*b*, 412*c* or 412N and a DC-to-AC low voltage drive 414*a*, 414*b*, 414*c* or 414N operatively coupled, via a respective isolated DC bus 416*a*, 416*b*, 416*c* or 416N, to the rectifier 412*a*, 412*b*, 412*c* or 412N of the respective low voltage drive or system 404*a*, 404*b*, 404*c* or 404N. For example, each low voltage drive or system 404*a*-404N may be a 500 HP low voltage drive commercially available from Yaskawa that includes a rectifier, such as voltage drive model CIMR-G7U-43000. Each rectifier 412*a*, 412*b*, 412*c* and 412N has a plurality of power inputs operatively connected to a corresponding set of low voltage three phase outputs a1, b1, c1; a2, b2, c2; a3, b3, c3; or aN, bN, cN from a respective input transformer 402*a*, 402*b*, 402*c* and 402N. Each rectifier 412*a*, 412*b*, 412*c* and 412N is operatively configured to separately convert AC power on each low voltage three phase output a1, b1, c1, a2, b2, c2, a3, b3, c3, aN, bN, or cN from the respective input transformer 402*a*, 402*b*, 402*c* or 402N to a corresponding filtered DC power output (using rectifying diodes, passive or active filters, and/or other known rectifying and filtering components or techniques) and to provide each corresponding filtered DC power output on the isolated DC bus 416a, 416b, 416c or 416N to the DC-to-AC drive 414a, 414b, 414c and 414N.

Each DC-to-AC drive 414a, 414b, 414c and 414N is operatively configured to generate a respective set of three phase power outputs u1, v1, w1; u2, v2, w2; u3, v3, w3; or uN, vN, wN, based on the corresponding filtered DC power outputs received from the rectifier 412a, 412b, 412c or 412N so that each power output u1, v1, w1, u2, v2, w2, u3, v3, w3, uN, vN or wN is substantially in-phase with the respective power input a1, b1, c1, a2, b2, c2, a3, b3, c3, aN, bN or cN. Each power output u1, v1, w1, u2, v2, w2, u3, v3, w3, uN, vN and wN is separately referenced to a ground input 418a, 418b, 418c, or 418N of the respective DC-to-AC drive 414a, 414b, 414c and 414N to isolate each DC-to-AC low voltage drive 414a-414N from each other and each power output u1, v1, w1, u2, v2, w2, u3, v3, w3, uN, vN and wN from each other power output of the same DC-to-AC low voltage 414a-414N.

In the implementation shown in FIG. 4, the secondary winding connection arrangement 126 operatively connects in series each output secondary winding of each output secondary winding circuit in each of the individual transformers 304a-304N that is associated with or has the same phase (e.g., windings 136u1, 136u2, 136u3, and 136uN associated with phase input A or u in FIGS. 2B and 4; windings 136v1, 136v2, 136v3, and 136vN associated with phase input B or v in FIGS. 2B and 4; and windings 136w1, 136w2, 136w3, and 136wN associated with phase input C or w in FIGS. 2B and 4) to form each of three phase-shifted outputs 128, 130, and 132 as shown in FIG. 2B.

Figure 5:
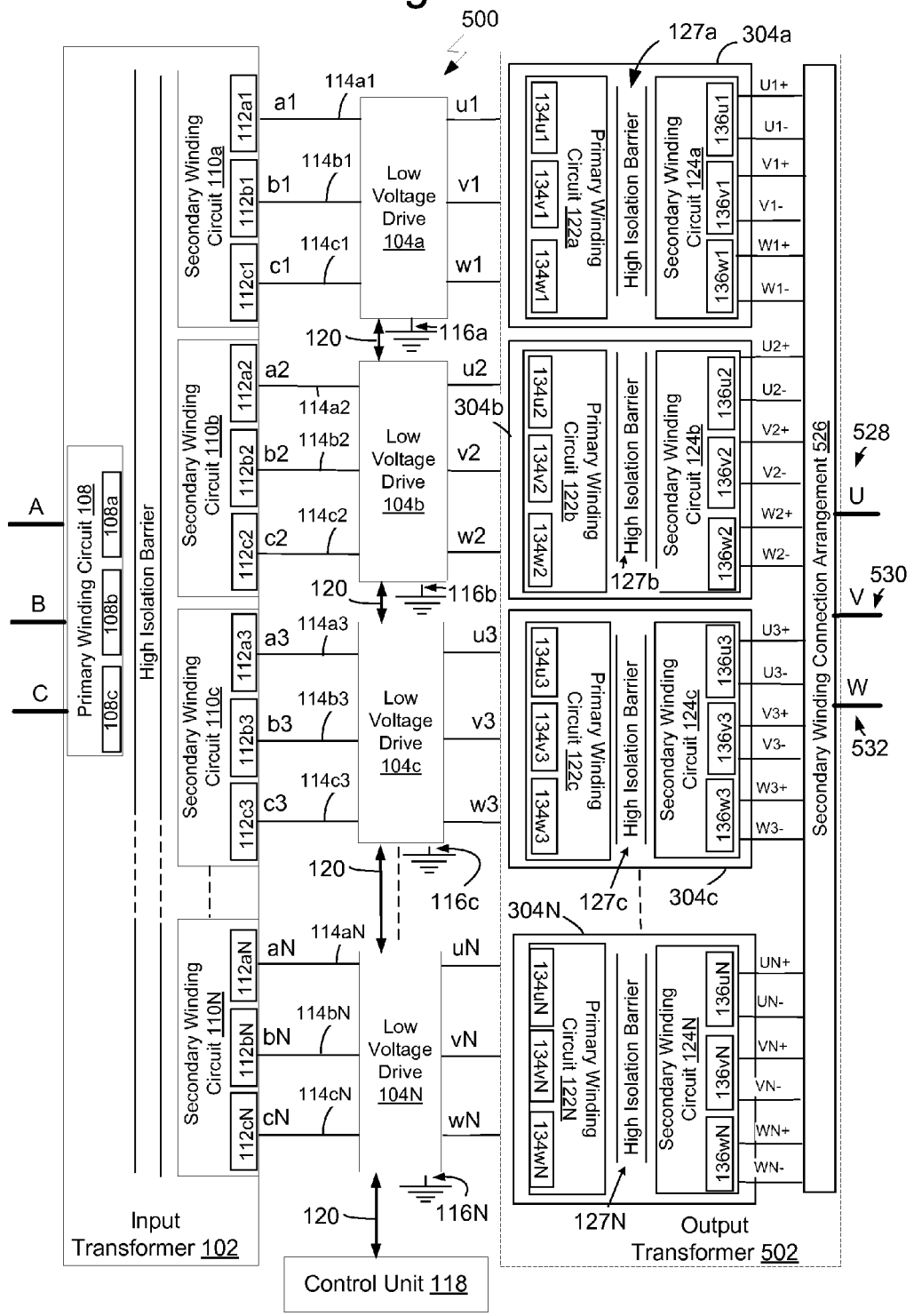
FIG. 5 is a block diagram of another exemplary medium voltage power converter consistent with the present invention in which the output transformer of the medium voltage power converter has a plurality of individual transformers each of which has a respective input primary winding circuit and a respective output secondary winding circuit where each secondary winding of each output secondary winding circuit of each individual transformer having the same phase are connected in parallel to form one of three phase-shifted outputs of the output transformer.

FIG. 5 depicts another exemplary medium voltage power converter 500 consistent with the present invention. The medium voltage power converter 500 includes an input transformer 102, a plurality of low voltage drives 104a-104N, and an output transformer 502 having a secondary winding connection arrangement 526 consistent with the medium voltage power converter 100 and 300. However, the secondary winding connection arrangement 526 of output transformer 502 is operatively configured to connect in parallel each secondary winding 136u1, 136v1, 136w1, 136u2, 136v2, 136w2, 136u3, 136v3, 136w3, 136uN, 136vN and 136wN of each output secondary winding circuit 124a-124N of the output transformer 502 (which may include individual transformers 304a-304N) having the same phase u, v, or w to form each of three phase-shifted outputs 528, 530, and 532 of the output transformer 502 as shown in FIGS. 6A and 6B.

Figure 6A:
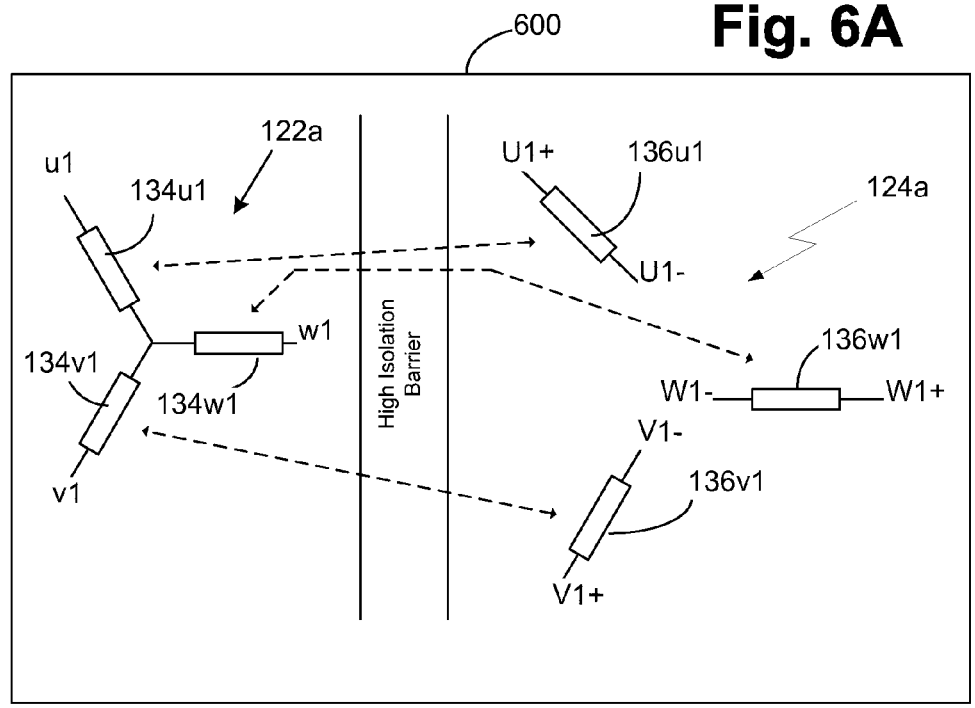
FIG. 6A is a block diagram depicting the structure of one of a plurality of input primary winding circuits of one of the individual transformers in the medium voltage power converter of FIG. 5 and a corresponding one of a plurality of output secondary winding circuits in the output transformer in accordance with the present invention.

FIG. 6A depicts one implementation of the structural phase relationship 600 between the secondary windings (e.g., 136u1, 136v1, and 136w1) of each output secondary winding circuit (e.g., 124a) and the primary windings (e.g., 134u1, 134v1, and 134w1) of each corresponding input primary winding circuit (e.g., 122a) of the output transformer 502 in accordance with the present invention. As shown in FIGS. 5 and 6A, each output secondary winding 136u1, 136v1, 136w1, 136u2, 136v2, 136w2, 136u3, 136v3, 136w3, 136uN, 136vN, and 136wN has two polarized ends (e.g., U1+, U1−; V1+, V1−; or W1+, W1− for windings 136u1, 136v1, and 136w1, respectively) reflecting the phase (e.g., U, V, or W) and current direction (e.g., negative to positive) associated with the respective output secondary winding 136u1, 136v1, 136w1, 136u2, 136v2, 136w2, 136u3, 136v3, 136w3, 136uN, 136vN, and 136wN.

Figure 6B:
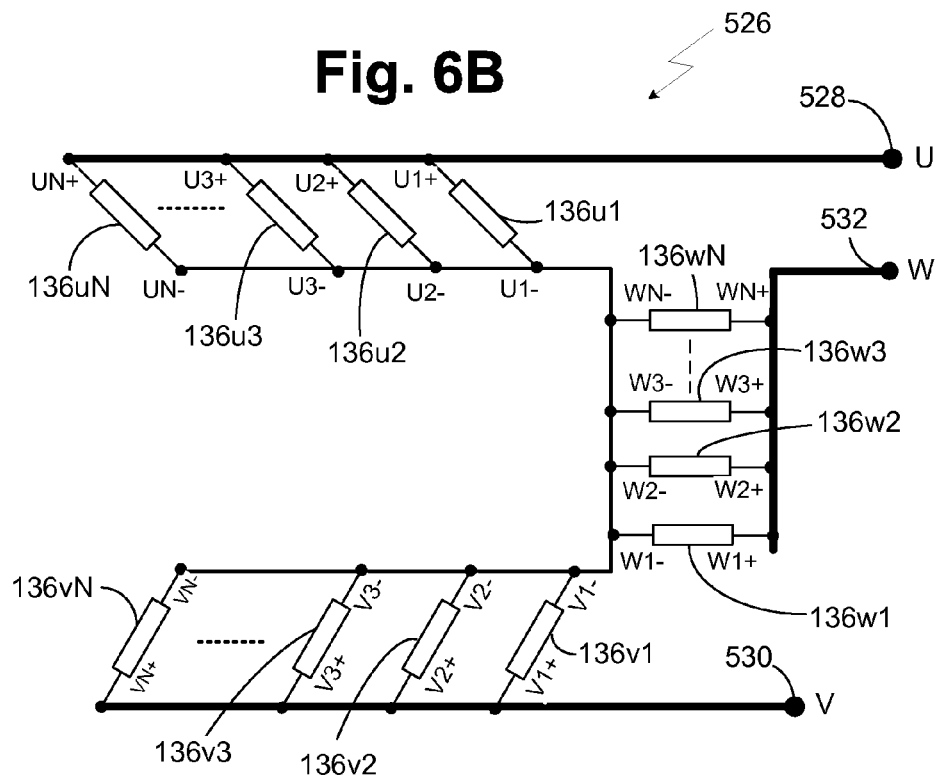
FIG. 6B is a block diagram depicting one embodiment of a secondary winding connection arrangement of the output transformer in FIG. 5 in accordance with the present invention, where each secondary winding of each output secondary winding circuit in each individual transformer having the same phase are connected in parallel to form one of three phase-shifted outputs of the output transformer.

FIG. 6B depicts one embodiment of the secondary winding connection arrangement 526 of the output transformer 502 consistent with the present invention. In the implementation shown in FIG. 6B, each output secondary winding of each output secondary winding circuit in the output transformer 502 associated with or having the same phase (e.g., windings 136u1, 136u2, 136u3, and 136uN associated with phase input A or u in FIGS. 5, 6A, and 6B; windings 136v1, 136v2, 136v3, and 136vN associated with phase input B or v in FIGS. 5, 6A, and 6B; and windings 136w1, 136w2, 136w3, and 136wN associated with phase input C or w in FIGS. 5, 6A, and 6B) are connected in parallel to form a respective one of three phase-shifted outputs 528, 530, and 532 of the output transformer 502. Each phase-shifted output 528, 530, and 532 of the secondary winding connection arrangement 526 is operatively connected to one of the output secondary windings (e.g., 136u1, 136v1, and 136w1) of each output secondary winding circuit (e.g., 124a-124N). For example, in the implementation shown in FIG. 6B, a first of the output secondary windings of each output secondary winding circuit associated with phase input A or u (e.g., 136u1, 136u2, 136u3 and 136uN) are connected in parallel to generate a first 528 of the phase-shifted outputs 528, 530, and 532 of the secondary winding connection arrangement 526, a second of the output secondary windings of each output secondary winding circuit associated with phase input B or v (e.g., 136v1, 136v2, 136v3 and 136vN) are connected in parallel to generate a second 530 of the phase-shifted outputs 528, 530, and 532 of the secondary winding connection arrangement 526, and a third of the output secondary windings of each output secondary winding circuit associated with phase input C or w (e.g., 136w1, 136w2, 136w3 and 136wN) are connected in parallel to generate a third 532 of the phase-shifted outputs 528, 530, and 532 of the secondary winding connection arrangement 526. In this implementation, the three phase-shifted outputs 528, 530 and 532 are joined in a wye connection via the parallel connection of each output secondary winding (e.g., 136u1, 136v1, and 136w1) of each output secondary winding circuit 124a-124N associated with a respective phase input u, v, or w. The secondary winding connection arrangement 526 allows each phase-shifted output 528, 530 and 532 to generate respective medium voltages (e.g., 700 VAC to 15 kVAC) from each power output of the standard low voltage drives 104a-104N having the same phase u, v, or w.

Thus, each disclosed medium voltage power converter 100, 300, 400, and 500 is able to generate phase-shifted output 128, 130 and 132 having medium voltages (e.g., 700 VAC to 15 kVAC) using a plurality of standard low voltage drives 104a-104N or 404a-404N and an output transformer 106, 302, and 502 that has a secondary winding connection arrangement 126 or 526, which operatively connects in series or in parallel each output secondary winding of each output secondary winding circuit in the output transformer that is associated with or has the same phase (e.g., windings 136u1, 136u2, 136u3, and 136uN associated with phase input A or u; windings 136v1, 136v2, 136v3, and 136vN associated with phase input B or v; and windings 136w1, 136w2, 136w3, and 136wN associated with phase input C or w). Because the medium voltage power converter 100, 300, 400, and 500 is implemented using a passive input transformer, standard low voltage drives, and a passive output transformer, the medium voltage power converter 100, 300, 400, and 500 is able to achieve medium voltage three phase drive functionality at a lower cost and with increased modularity than conventional medium voltage drives while eliminating low frequency harmonics that may be present with other conventional medium voltage drives.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A medium voltage power converter, comprising:
an input transformer having a primary winding circuit and a plurality of secondary winding circuits, said primary winding circuit being adapted to connect to a multi-phase AC power source, each secondary winding circuit having three or more phase-shifted outputs;
a plurality of low voltage drives, each low voltage drive having a plurality of power inputs and a plurality of power outputs, each power input being operatively connected to a corresponding one of the phase-shifted outputs of a respective one of the secondary winding circuits, each power output being operatively connected to a respective one of the power inputs such that each power output is adapted to provide a current substantially in-phase with the respective one power input; and
an output transformer having a plurality of input primary winding circuits, a plurality of output secondary winding circuits, and a secondary winding connection arrangement having a plurality of phase-shifted outputs, each of the input primary winding circuits having a plurality of input primary windings, each input primary winding being operatively connected to a respective one of the power outputs of a respective one of the low voltage drives, each output secondary winding circuit having a plurality of output secondary windings, each output secondary winding disposed in relation to a respective one of the input primary windings;
wherein each phase-shifted output of the secondary winding connection arrangement is operatively connected to one of the output secondary windings of each output secondary winding circuit.

2. A medium voltage power converter of claim 1, wherein each phase-shifted output of the secondary winding connection arrangement is operatively connected to one of the output secondary windings of each output secondary winding circuit connected in series.

3. A medium voltage power converter of claim 1, wherein there are three phase-shifted outputs each joined in a wye connection via the series connection of the one output secondary winding of each output secondary winding circuit.

4. A medium voltage power converter of claim 1, wherein each phase-shifted output of the secondary winding connection arrangement is operatively connected to one of the output secondary windings of each output secondary winding circuit connected in parallel.

5. A medium voltage power converter of claim 1, wherein there are three phase-shifted outputs each joined in a wye connection via the parallel connection of the one output secondary winding of each output secondary winding circuit.

6. A medium voltage power converter of claim 1, wherein the output transformer comprises a plurality of individual transformers each of which has a respective one of the plurality of input primary winding circuits and a respective one of the plurality of output secondary winding circuits.

7. A medium voltage power converter of claim 1, wherein the primary winding circuit is one of a plurality of primary winding circuits and the input transformer comprises a plurality of individual step-down transformers each of which has a respective one of the plurality of primary winding circuits and a respective one of the plurality of secondary winding circuits.

8. A medium voltage power converter of claim 7, wherein each low voltage drive comprises a rectifier and a DC-to-AC drive operatively coupled to the rectifier, the rectifier having the power inputs for the respective low voltage drive and the DC-to-AC drive having the power outputs for the respective low voltage drive.

9. A medium voltage power converter of claim 1, wherein each low voltage drive is adapted to receive up to approximately 690 VAC on each power input of the low voltage drive.

10. A medium voltage power converter, comprising:
an input transformer having a primary winding circuit and a plurality of secondary winding circuits, said primary winding circuit being adapted to connect to a multi-phase AC power source, each secondary winding circuit having three phase-shifted outputs each adapted to provide up to approximately 700 VAC;
a plurality of low voltage drives, each low voltage drive having a plurality of power inputs each of which is operatively connected in phase relationship to a respective one of the three phase-shifted outputs from a respective one of the secondary winding circuits, and a plurality of power outputs operatively connected to a respective one of the power inputs such that each power output is adapted to provide a current substantially in-phase with the respective one power input; and
an output transformer having a plurality of input primary winding circuits, a plurality of output secondary winding circuits and a secondary winding connection arrangement having three phase-shifted outputs, each of the input primary winding circuits having three input primary windings each of which is operatively connected in phase relationship to a respective one of the power outputs of a respective one of the low voltage drives, each output secondary winding circuit having three output secondary windings each of which is operatively connected in phase relationship with a respective one of the input primary windings of a respective one of the input primary winding circuits;
wherein a first of the output secondary windings of each output secondary winding circuit are connected in series to generate a first of the phase-shifted outputs of the secondary winding connection arrangement, a second of the output secondary windings of each output secondary winding circuit are connected in series to generate a second of the phase-shifted outputs of the secondary winding connection arrangement, and a third of the output secondary windings of each output secondary winding circuit are connected in series to generate a third of the phase-shifted outputs of the secondary winding connection arrangement.

11. A medium voltage power converter, comprising:
an input transformer having a primary winding circuit and a plurality of secondary winding circuits, said primary winding circuit being adapted to connect to a multi-phase AC power source, each secondary winding circuit having three phase-shifted outputs each adapted to provide up to approximately 700 VAC;
a plurality of low voltage drives, each low voltage drive having a plurality of power inputs each of which is operatively connected in phase relationship to a respective one of the three phase-shifted outputs from a respective one of the secondary winding circuits, and a plurality of power outputs operatively connected to a respective one of the power inputs such that each power output is adapted to provide a current substantially in-phase with the respective one power input; and an output transformer having a plurality of input primary winding circuits, a plurality of output secondary winding circuits and a secondary winding connection arrangement including three phase-shifted outputs, each of the input primary winding circuits having three input primary windings each of which is operatively connected in phase relationship to a respective one of the power outputs of a respective one of the low voltage drives, each output secondary winding circuit having three output secondary windings each of which is operatively connected in phase relationship with a respective one of the input primary windings of a respective one of the input primary winding circuits;

wherein a first of the output secondary windings of each output secondary winding circuit are connected in parallel to generate a first of the phase-shifted outputs of the secondary winding connection arrangement, a second of the output secondary windings of each output secondary winding circuit are connected in parallel to generate a second of the phase-shifted outputs of the secondary winding connection arrangement, and a third of the output secondary windings of each output secondary winding circuit are connected in parallel to generate a third of the phase-shifted outputs of the secondary winding connection arrangement.

* * * * *